United States Patent
Baeuerle et al.

(10) Patent No.: US 6,536,679 B2
(45) Date of Patent: Mar. 25, 2003

(54) HEATING SYSTEM

(75) Inventors: Michael Baeuerle, Markgroeningen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 09/958,281

(22) PCT Filed: Jan. 26, 2001

(86) PCT No.: PCT/DE01/00308

§ 371 (c)(1),
(2), (4) Date: Jan. 9, 2002

(87) PCT Pub. No.: WO01/59272

PCT Pub. Date: Aug. 16, 2001

(65) Prior Publication Data

US 2002/0179726 A1 Dec. 5, 2002

(30) Foreign Application Priority Data

Feb. 8, 2000 (DE) .......................................... 100 05 490

(51) Int. Cl.⁷ ................................................ B60H 1/02
(52) U.S. Cl. .............................. 237/12.3 C; 237/12.3 K; 165/41
(58) Field of Search ........................ 237/12.3 C, 12.3 R; 165/41, 42

(56) References Cited

U.S. PATENT DOCUMENTS

| 2,240,368 A | * | 4/1941 | Le Fevre ..................... 165/119 |
| 4,830,098 A | * | 5/1989 | Okura et al. .................. 165/42 |
| 4,925,091 A | * | 5/1990 | Yangagihara et al. ... 237/12.3 A |
| 4,927,077 A | * | 5/1990 | Okada ................... 237/12.3 C |
| 4,934,160 A | * | 6/1990 | Mueller ....................... 122/366 |
| 5,335,500 A | * | 8/1994 | Wunderlich et al. ......... 123/561 |
| 5,571,484 A |   | 11/1996 | Pettit |
| 5,582,095 A | * | 12/1996 | Rial ........................... 126/19.5 |
| 6,079,629 A | * | 6/2000 | Morikawa et al. ...... 237/12.3 C |
| 6,220,522 B1 | * | 4/2001 | Suzuki ....................... 237/12.1 |

FOREIGN PATENT DOCUMENTS

| DE | 195 08 013 C | 3/1996 |
| DE | 195 20 122 A | 12/1996 |
| FR | 2 708 041 A | 1/1995 |
| GB | 2 292 587 A | 2/1996 |

OTHER PUBLICATIONS

Patent Abstracts of Japan vol. 013, No. 202 (M–824), May 12, 1989 & JP 01 024118 A, Jan. 26, 1989.
Patent Abstracts of Japan vol. 1996, No. 09 Sep. 30, 1996 & JP 08 135457 A, May 28, 1996.

* cited by examiner

*Primary Examiner*—Derek Boles
(74) *Attorney, Agent, or Firm*—Michael J. Striker

(57) ABSTRACT

The invention is based on a heating system for a motor vehicle, which is driven by an internal combustion engine (10), in which a heater (30) includes a combustion chamber (32) with a fuel injection device (34) and an ignition device (35) and also includes an air blower (40), and is triggered as a function of operating parameters and/or ambient parameters of the motor vehicle and/or of the internal combustion engine (10) or by actuating signals.

It is proposed that the combustion chamber (32) is connected to the exhaust system (62) of the internal combustion engine (10) in the region of an exhaust manifold (62) of the internal combustion engine (10), between outlet valves (24) and a exhaust gas catalytic converter (56), via an exhaust line (42).

8 Claims, 1 Drawing Sheet

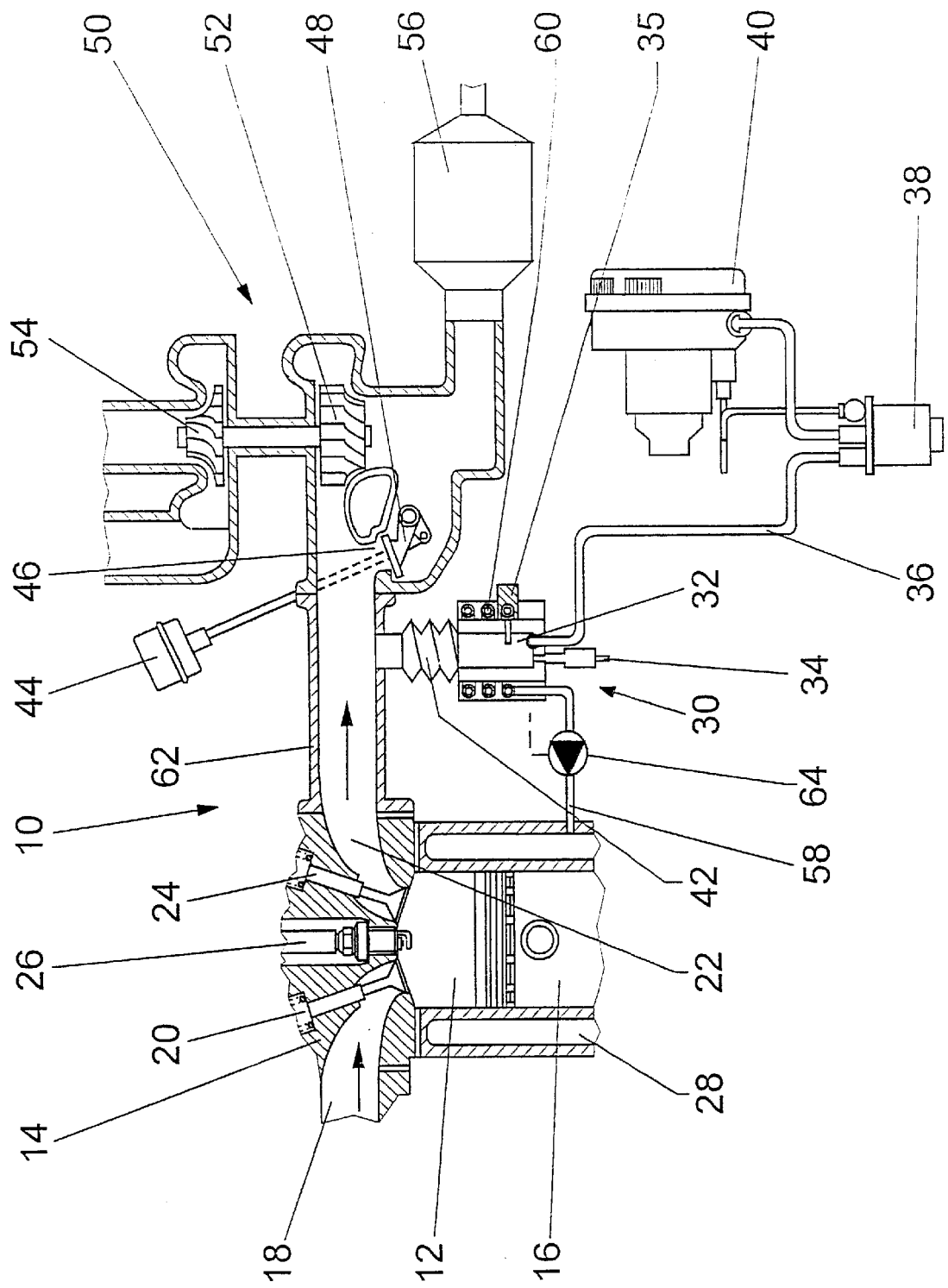

HEATING SYSTEM

PRIOR ART

The invention is based on a heating system as generically defined by the preamble to claim 1.

In some operating states of an internal combustion engine, such as cold starting, short trips, or long downhill trips by motor vehicles, the heat input into the coolant from the engine itself is no longer sufficient, especially if the efficiency of the engine is very high, as in the case of direct gasoline injection, high pressure diesel injection with a common rail, or a highly charged engine with a turbocharger, since then only slight heat losses occur. Accordingly, the engine and its catalytic converter do not reach their optimal temperatures within the brief available time, or do so only quite late, which leads to increased fuel consumption and increased exhaust emissions.

Since at low outdoor temperatures considerable amounts of heat are required to de-ice the vehicle windows or to heat the passenger compartment, both driving safety and comfort are restricted. Furthermore, future drive system concepts, such as hybrid vehicles, require an additional heat source during electrical operation in order to heat the passenger compartment or the catalytic converter. This problem is currently solved predominantly by using chemical or electrical auxiliary heaters. Chemical auxiliary heaters, such as burners, do offer great comfort because of the capability of heating even while the engine is at a stop, but are relatively expensive. Conventional electrical auxiliary heaters operating on the principle of resistance heating are highly limited in power, because the generator cannot make enough current available.

ADVANTAGES OF THE INVENTION

According to the invention, a combustion chamber is connected to the exhaust system of the internal combustion engine in the region of an exhaust manifold of the internal combustion engine, between outlet valves and a exhaust gas catalytic converter, via an exhaust line. As needed, the combustion chamber is put into operation, so that by it, hot exhaust gases of the exhaust system of the engine are heated. This includes primarily the exhaust gas catalytic converter, which very quickly reaches its optimal operating temperature, but also the exhaust conduits as far as the outlet valves, and as a result, the engine itself and especially its cylinder head reaches its operating temperature faster.

To achieve a more-intensive heat exchange between the combustion chamber and the engine, it is expedient that coolant conduits of a heat exchanger surround the combustion chamber and are connected to a coolant system of the engine. Thus the combustion chamber can on the one hand already preheat the engine before the engine is started, and on the other, the heater connected to the coolant system of the engine can take care of the passenger compartment. Via electronically triggered valves, the quantity of heat can be distributed to suit existing priorities.

In supercharged engines, the combustion chamber can also serve to improve the response performance of the exhaust gas turbocharger, by increasing the quantity and energy of the exhaust gas in the lower rpm range. The resultant higher rpm of the exhaust gas turbine and the radial compressor makes a higher charge pressure possible, which leads to improved acceleration of the engine at more favorable efficiency. The exhaust gas turbine is expediently disposed upstream of the exhaust gas catalytic converter and can be circumvented by a bypass that has a control device. As a result, the exhaust gas turbine can be regulated. Furthermore, because of the bypass, hot exhaust gases while the engine is at a stop reach the catalytic converter directly and already bring it to a suitable operating temperature before the engine is started.

By means of the heating system of the invention, it is thus possible to meet all the demands made of a modern internal combustion engine with only a single combustion chamber and at little engineering effort and expense.

DRAWING

Further advantages will become apparent from the ensuing drawing description. In the drawing, one exemplary embodiment of the invention is shown. The drawing, description and claims includes numerous characteristics in combination. One skilled in the art will expediently consider the characteristics individually as well and put them together to make useful further combinations.

The sole drawing FIGURE schematically shows a fragmentary section through an internal combustion engine having a heating system of the invention.

DESCRIPTION OF THE EXEMPLARY EMBODIMENT

The internal combustion engine 10 has cylinders 12, which between pistons 16 and a cylinder head 14 form work chambers, to which air is delivered via inlet conduits 18. Via outlet conduits 22, the piston 16 expels the exhaust gas into an exhaust manifold 62. The inlet conduits 18 and the outlet conduits 22 are controlled by inlet valves 20 and outlet valves 24, respectively. An ignition aid 26, in the form of a spark plug in the case of the Otto process, initiates the combustion of the fuel-air mixture in the cylinder 12, while an ignition aid 26, in the form of a glow plug in the diesel process, serves to preheat the combustion air.

A combustion chamber 32 of a heater 30 is connected to the exhaust manifold 62 of the engine 10 via an exhaust line 42. The exhaust line 42 is expediently embodied as a metal bellows, so that it can compensate for different thermal expansions as a consequence of different temperatures between the combustion chamber 32 and the exhaust manifold 62. Fuel is delivered to the combustion chamber via an injection valve 34, while an air blower 40, via a control unit 38 and an air delivery line 36 pumps air into the combustion chamber 32. An ignition aid 35 brings the mixture to ignition. As in the case of the ignition aid 26, this can involve either a spark plug or a glow plug. The combusted fuel-air mixture leaves the combustion chamber 32 and flows into the exhaust manifold 62, where it increases the quantity and energy of the exhaust gas from the engine 10.

Before the engine 10 is started, the exhaust gas flows, for instance via a bypass 46, to an exhaust gas catalytic converter 56, which can thus already be brought to its operating temperature before the engine 10 starts. This considerably improves exhaust emissions. In the bypass 46, there is a control device 48, which is actuated by an electronically triggerable actuator 44. The control device 48 simultaneously regulates the throughput through an exhaust gas turbine 52 of an exhaust gas turbocharger 50, which can be driven to an increased extent by the additional exhaust gas quantity and energy of the combustion chamber 32 in the lower rpm range of the engine 10, so that because of the higher rpm of a radial compressor 54 communicating with the exhaust gas turbine 52, the charge pressure in the inlet conduits 18 can be increased, so that the engine 10 accelerates faster.

A heat exchanger 60 surrounds the combustion chamber 32. Its coolant conduits communicate via a connecting line 58 with coolant conduits 28 and coolant chambers of the engine 10, so that the combustion chamber 32 can heat the coolant of the cooling and heating system of the engine 10. For recirculation of the coolant, an electrically driven pump 64 is preferably used. Instead of the recirculating pump, a switching valve would also be conceivable, which opens the coolant system during heating. The heat exchanger 60 thus assures that the engine 10 can be preheated while it is stopped, and that heat exchangers, connected to the coolant system, for instance for heating the passenger compartment or the vehicle windows, will be supplied with heat during a stop or while the engine is being started.

LIST OF REFERENCE NUMERALS 10 internal combustion engine
12 cylinder
14 cylinder head
16 piston
18 inlet conduit
20 inlet valve
22 outlet valve
24 outlet valve
26 ignition aid
28 coolant conduit
30 heater
32 combustion chamber
34 injection valve
35 ignition device
36 air delivery line
38 control unit
40 air blower
42 exhaust line
44 actuator
46 bypass
48 control device
50 exhaust gas turbocharger
52 exhaust gas turbine
54 radial compressor
56 exhaust gas catalytic converter
58 connecting line
60 heat exchanger
62 exhaust manifold
64 pump

What is claimed is:

1. A heating system for a motor vehicle, which is driven by an internal combustion engine (10), in which a heater (30) includes a combustion chamber (32) with a fuel injection device (34) and an ignition device (35) and also includes an air blower (40), and is triggered as a function of operating parameters and/or ambient parameters of the motor vehicle and/or of the internal combustion engine (10) or by actuating signals, characterized in that the combustion chamber (32) is connected to the exhaust system (62) of the internal combustion engine (10) in the region of an exhaust manifold (62) of the internal combustion engine (10), between outlet valves (24) and an exhaust gas catalytic converter (56), via an exhaust line (42), wherein an exhaust gas turbine (52) of an exhaust gas turbocharger (50) is disposed downstream of the orifice of the exhaust line (42) into the exhaust system (62).

2. The heating system of claim 1, characterized in that the exhaust line (42) of the combustion chamber (32) is embodied at least in part as a corrugated tube.

3. The heating system of one of the foregoing claims, characterized in that coolant conduits of a heat exchanger (60) surround the combustion chamber (32) and are connected to a coolant system (28) of the engine (10).

4. The heating system of claim 3, characterized in that at least one electrically driven pump (64) or electrically triggered switching valve is assigned to the coolant system (28) of the engine (10) and/or to the heat exchanger (60).

5. The heating system of claim 1, characterized in that the exhaust gas turbine (52) is disposed upstream of the exhaust gas catalytic converter (66) and can be circumvented by a bypass (46), which has a control device (48).

6. The heating system of one of the foregoing claims, characterized in that the system is used for auxiliary heating and is triggered before the engine is started.

7. The heating system of one of the foregoing claims, characterized in that the system is used to heat up at least one catalytic converter.

8. The heating system of claim 1, characterized in that the system is triggered, with the goal of increasing the charge pressure, during an acceleration event or after a demand for power has been made of the engine.

* * * * *